United States Patent [19]

Krambrock et al.

[11] Patent Number: 5,660,215
[45] Date of Patent: Aug. 26, 1997

[54] LOADING APPARATUS FOR BULK MATERIALS

[75] Inventors: Wolfgang Krambrock, Vogt; Harald Wilms, Tettnang, both of Germany; Gurdarshan Singh Brar, Houston, Tex.

[73] Assignee: Zeppelin Schuettguttechnik GmbH, Weingarten, Germany

[21] Appl. No.: 549,309

[22] Filed: Oct. 27, 1995

[30] Foreign Application Priority Data

Oct. 27, 1994 [DE] Germany .................. 44 38 135.2

[51] Int. Cl.$^6$ ............... B65G 67/06; B65G 69/02; B65D 88/28
[52] U.S. Cl. ............... 141/286; 141/67; 141/236; 414/293; 414/299; 406/93; 406/146; 406/155
[58] Field of Search ............. 141/67, 231, 236, 141/237, 286; 414/295, 299; 406/93–95, 122, 146, 155

[56] References Cited

U.S. PATENT DOCUMENTS

| | | | |
|---|---|---|---|
| 575,550 | 1/1897 | Mathews | 366/182.3 |
| 1,309,671 | 7/1919 | Weaver | 406/146 X |
| 2,359,029 | 9/1944 | Goldberg | 141/67 X |
| 2,792,262 | 5/1957 | Hathorn | 406/146 |
| 3,469,718 | 9/1969 | Felx et al. | 414/301 |
| 3,604,758 | 9/1971 | Flain et al. | 406/93 X |
| 3,708,208 | 1/1973 | Fuss | 406/155 X |
| 3,881,610 | 5/1975 | Hessling | 414/299 X |
| 3,976,332 | 8/1976 | Fabel | 406/146 X |
| 4,225,033 | 9/1980 | Fukagai et al. | 414/299 X |
| 4,413,935 | 11/1983 | Smith et al. | 406/155 X |
| 4,529,337 | 7/1985 | Hilgraf et al. | 414/293 X |
| 5,052,451 | 10/1991 | Gentilcore et al. | 141/67 |

FOREIGN PATENT DOCUMENTS

| | | |
|---|---|---|
| 0033996 | 8/1981 | European Pat. Off. |
| 0076472 | 4/1983 | European Pat. Off. |
| 0076660 | 4/1983 | European Pat. Off. |
| 0460355 | 12/1991 | European Pat. Off. |
| 1101280 | 3/1961 | Germany |
| 1168344 | 4/1964 | Germany |
| 1953559 | 12/1967 | Germany |
| 2703 329 | 8/1978 | Germany |
| 3727561 | 3/1989 | Germany |
| 3842549 | 6/1990 | Germany |

*Primary Examiner*—J. Casimer Jacyna
*Attorney, Agent, or Firm*—Spencer & Frank

[57] ABSTRACT

A loading apparatus for bulk material includes a loading tube having a longitudinal axis, an outer tube surface, an inner tube surface and a material discharge end; a deflection body having an outer body surface and being arranged generally coaxially with the loading tube at the material discharge end thereof. The deflection body is situated partially inside and partially outside of the loading tube. The outer body surface and the inner tube surface together define an annular channel surrounding the longitudinal axis. The outer body surface and the inner tube surface each has a terminal peripheral portion together defining a circumferential, deflecting and accelerating duct forming part of the annular channel and terminating in an annular outlet slot surrounding the longitudinal axis. The terminal peripheral portion of the outer body surface is oriented away from the longitudinal axis such as to effect a radially outward flow of the bulk material from the loading tube. Further, a securing device attaches the deflection body to the loading tube.

19 Claims, 5 Drawing Sheets

5,660,215

LOADING APPARATUS FOR BULK MATERIALS

BACKGROUND OF THE INVENTION

In many application areas, bulk materials are loaded, for transportation purposes, from storage silos into corresponding filling containers on transporting vehicles, e.g. on lorries or railway wagons. In this arrangement, a loading tube is usually introduced into the filling container, from above, through an introduction opening. The loading tube is then charged with the respective bulk materials either by means of the static pressure of the bulk materials, which in this case prevails in a silo above the loading tube, or via a pneumatic conveying device.

As loading tube, use is often made of a so-called loading telescope, in the case of which at least two tubes can be pushed telescopically one into the other. Such a loading telescope may be varied in length, which is advantageous, in particular, when introducing such a loading tube into the introduction opening of a filling container.

If, then, bulk materials are conveyed into a filling container via an open tube, said bulk materials, due to internal friction, are not distributed horizontally into the container, as would be the case for a liquid. Rather, a conical loose fill with a so-called slope angle is usually formed. In this arrangement, the tube remains full at the end and empties only when it is pulled upwards.

The distribution of the bulk materials with the abovementioned slope angle results in the disadvantage that the filling container cannot be filled to the full extent. This is undesirable, in particular when the maximum transporting load of the transporting vehicle has not yet been utilized by the quantity of bulk materials introduced into it. Due to the cavities which remain, after the filling operation, in the upper corner or border regions of the filling container, a considerable fraction of the transporting capacity is left unutilized.

In order to provide an overflow-prevention means in the case of an apparatus as is described above, a so-called full-level indicator has been fitted, in known apparatuses, beneath the tube opening and protected with a cone roof. By virtue of such a protective roof, the bulk-material stream is deflected to the side to a certain extent as a secondary effect. However, in this arrangement too, the bulk-material stream does not reach the filling-container outer regions which are further away from the loading tube. Just as before, a conical loose fill is formed, the corresponding angle being slightly smaller than the slope angle without a static distribution cone formed by the protective roof.

In the case of filling which is carried out exclusively due to the static pressure of the bulk materials, filling without a slope angle can generally not be achieved by means of a static distribution cone since the outer regions of the filling container lie at such a transverse distance away from the filling tube that bulk materials accelerated vertically only due to gravity do not experience sufficient transverse acceleration as a result of the deflection on such a distribution cone.

For this reason, further developments in which a distribution cone has been arranged in a rotating manner have been disclosed. Due to the resulting centrifugal forces, the necessary transverse acceleration could be achieved, which made possible a loose fill with better utilization of space.

Although a largely horizontal distribution of the bulk materials is achieved using such a centrifugal wheel, this often resulted in damage to the product to be loaded as bulk material. In addition, it was necessary, in this arrangement, to fit rotating parts with a corresponding drive into the bulk-material stream. In order to ensure problem-free operation here as regards the mounting of the rotating distribution cone, in particular also as regards a long service life, additional, high-outlay protective measures for the corresponding components are necessary.

Furthermore, loading apparatuses in which a curved baffle has been fitted, as distributor, beneath the tube opening of the loading tube have been disclosed. However, such baffles can only produce a sufficient transverse flow of the bulk materials when a high-performance pneumatic conveying installation is used, with the result that the flow speed moves between 15–35 m/sec. Such a baffle is not suitable for conveying without such a pneumatic conveying device, the baffle, in this case, acting only as an obstruction to flow.

SUMMARY OF THE INVENTION

The object of the invention is thus to propose a loading apparatus for bulk materials, in the case of which the bulk-material stream can be fed at a sufficient speed in the transverse direction in the filling container, with the result that a largely horizontal bulk-material distribution is produced in the filling container. This is intended to be possible without the use of movable aids within the bulk-material stream and without the necessity for pneumatic conveying.

This object and others to become apparent as the specification progresses, are accomplished by the invention, according to which, briefly stated, the loading apparatus for bulk material includes a loading tube having a longitudinal axis, an outer tube surface, an inner tube surface and a material discharge end; a deflection body having an outer body surface and being arranged generally coaxially with the loading tube at the material discharge end thereof. The deflection body is situated partially inside and partially outside of the loading tube. The outer body surface and the inner tube surface together define an annular channel surrounding the longitudinal axis. The outer body surface and the inner tube surface each has a terminal peripheral portion together defining a circumferential, deflecting and accelerating duct forming part of the annular channel and terminating in an annular outlet slot surrounding the longitudinal axis. The terminal peripheral portion of the outer body surface is oriented away from the longitudinal axis such as to effect a radially outward flow of the bulk material from the loading tube. Further, a securing device attaches the deflection body to the loading tube.

Accordingly, a loading apparatus according to the invention is distinguished in that a deflecting and accelerating duct is provided at the outlet end of the loading tube, the wall of which duct serves as a guide for the bulk-material stream. In this arrangement, the deflecting and accelerating duct is in connection with the loading tube by means of its inlet opening and exhibits an outwardly open mouth. The cross section of the deflecting and accelerating duct is, then, designed such that it decreases from the inlet opening toward the mouth. This results in a stable and accelerated flow in the accelerating duct.

Due to the routing of the wall of the deflecting and accelerating duct, the bulk materials are deflected from the conveying direction within the loading tube, i.e. usually from a vertical direction, into the transverse direction. The flow direction of the outflowing bulk materials is thus oriented in the desired direction.

In order that the bulk materials can travel far enough in the preferred direction, a corresponding speed is necessary.

By virtue of the decrease in the cross section of the deflecting and accelerating duct, the bulk-material stream is accelerated, in accordance with the known rules of fluid mechanics, as it approaches the mouth. In this manner, it is discharged from the mouth at a sufficient speed in order also to reach those regions of the filling container which are further away from the axis of the tube carrying the bulk materials.

In order to be able to apply the rules of fluid mechanics in the case of as many bulk materials as possible, a gas, e.g. air, is preferably supplied above the loading tube for loosening purposes. Since it is a question purely of downwards flow with utilization of acceleration due to gravitational force, only a low pressure is necessary for this additional gas, in contrast to a pneumatic conveying installation. By virtue of such a gas-loosening operation, bulk materials can be dispersed and accelerated. Such a gas/solids mixture behaves essentially in accordance with the rules of fluid mechanics. The particle speed and thus the distance covered can be regulated by the quantity of the gas, e.g. the air, which is fed in.

Advantageously, the cross section of the deflecting and accelerating duct is formed such that it decreases continuously from the inlet opening to the mouth. This makes it possible to achieve a defined flow, with the result that separation of solids and gas is avoided. Consequently, the paths taken by the particles can be calculated since the material flow behaves like a gas flow or liquid flow in an arc.

In an advantageous configuration of the invention, one wall of the deflecting and accelerating duct is formed by a tube extension with widened circumference on the outlet opening of the loading tube, and another wall of the deflecting and accelerating duct is formed by a deflection body which is introduced at least partially within the widened tube extension.

In this manner, it is possible to provide a deflecting and accelerating duct which encloses the entire circumference of the loading tube. This permits deflection and acceleration of the bulk-material stream along the entire circumference in all transverse directions.

By virtue of the abovementioned design of the loading tube in conjunction with a deflection body, it is, however, also readily conceivable to provide a plurality of ducts which are separated by intermediate walls and are distributed over the circumference of the loading tube, with the result that the deflection and acceleration takes place in a plurality of different transverse directions, preferably distributed evenly along the circumference, and the filling container is likewise filled with essentially horizontally distributed bulk materials.

The loading tube is preferably cylindrical at least in the region of transition to the widened tube extension, with the result that the widened tube extension exhibits the form of a ring and the deflecting duct has the form of an annular slot.

Such a geometry makes it possible to realize an outlet nozzle in which the bulk-material stream is discharged such that it is accelerated equally and distributed equally in all transverse directions. In a preferred exemplary embodiment, the outer wall and/or inner wall of the annular slot, which functions as outlet nozzle, is formed at least partially in frustoconical sections, such that it exhibits the form of a polygonal progression in section, with a section plane through the central axis. Such shaping can produce a largely continuous decrease in cross section for accelerating and deflecting the bulk-material flow, as is necessary according to the invention.

In a further advantageous embodiment, the outer wall and/or inner wall of the annular slot, which functions as outlet nozzle, is formed at least partially in the form of an annular-slot arc, such that it exhibits an arc with a variable radius of curvature in section, with a section plane through the central axis. In a nozzle shaped in this manner, a continuous decrease in cross section is again achieved, the paths taken by the particles here being approximated more to the theoretical paths of a flow in an arc.

Preferably, the deflection body is fastened in the loading tube by means of an axial bolt and transverse webs. In this arrangement, the transverse webs can form a transverse-web cross which is welded into the loading tube and, in the centre, exhibits a bore for receiving a central axial bolt.

Advantageously, the cross section of the deflecting and accelerating duct is configured such that it can be adjusted. As a result, the acceleration of the bulk-material stream can be regulated and adapted to different bulk-material properties and outputs.

An annular slot which can be adjusted in width is provided, for example, by regulating the height of the deflection body.

A number of different configurations are conceivable in order to achieve such a regulation in height. Such a configuration consists, for example, in the fact that the axial bolt cited above is configured as a screw-bolt which is screwed into an internal thread and is locked by a lock nut. However, it is also conceivable to provide height adjustment which can be actuated from the outside. This could take place via a pulling means, for example a cable pull which is introduced into the loading tube above the outlet opening and is attached at the upper end of the axial bolt. If the axial bolt, in this arrangement, is guided displaceably in a bore, for example of a transverse-web cross, then it can be adjusted in height via the cable pull.

Preferably, the slot shape of the deflecting and accelerating duct is adapted to the material of the bulk-material stream. Adaptation to the desired range of cover of the bulk materials in the transverse direction and an apparatus based on the arithmetically determinable, necessary paths taken by the particles is also conceivable, as is the adaptation to further parameters relevant in the case of special application problems.

In a further advantageous embodiment, the gas located above the bulk materials and the inflowing gas is extracted from the filling container and fed to the loading apparatus again for the gas-loosening operation of the bulk-material stream. Consequently, on the one hand, if air is not used for the purposes which have already been described above, a gas, for example an inert gas, can be considerably reduced as regards its quantity requirements. On the other hand, a subatmospheric pressure is produced in the filling container as a result of the gas being extracted therefrom, so that a pronounced acceleration is achieved in the outlet nozzle due to the greater pressure difference upstream and downstream of the nozzle.

In a further configuration of the invention, one, two or more loading tubes with outlet nozzles according to the invention are combined in a loading apparatus and connected to a common conveying line via one or more diverters. Using a loading apparatus configured in this manner, a number of chambers of a filling container, for example on a railway carriage, can be filled one after the other without the transporting vehicle having to be moved for this purpose.

The loading tube of a loading apparatus according to the invention may, as in the case of known apparatuses, be designed as a telescopic tube and/or be provided with a bellows as intermediate piece, this resulting in a loading tube which can be varied in length. This provides the already known advantages when the loading tube is introduced into the loading opening of the filling container. A flexible connection also permits precise positioning with different spacings of the introduction openings.

BRIEF DESCRIPTION OF THE DRAWINGS

A number of exemplary embodiments of the invention are explained in more detail with reference to the following figures and are represented in the drawing, in which, in detail.

DESCRIPTION OF THE PREFERRED EMBODIMENTS

Figure 1:
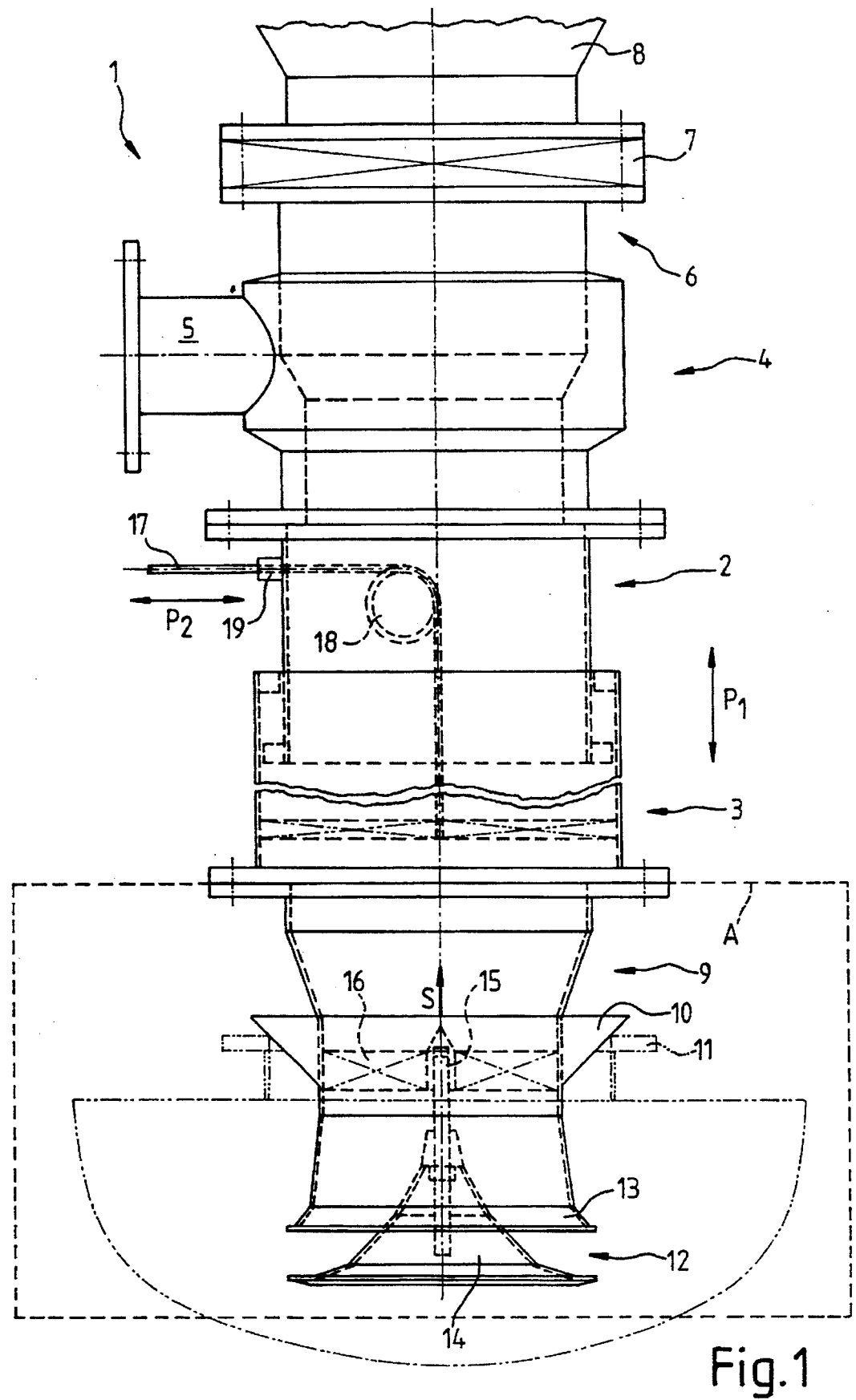
FIG. 1 shows a side view of a loading apparatus according to the invention.

Represented in the representation according to FIG. 1 is a loading tube 1, of a loading apparatus according to the invention, which is designed as a telescopic tube. It comprises two different-diameter tube parts 2, 3 which can be pushed one inside the other. Consequently, the lower tube part 3 can be displaced along the double arrow $P_1$ with respect to the upper tube part 2. Flanged on the upper side of the tube part 2 is an intermediate piece 4 into which a gas connection stub 5 is guided. The acceleration air is fed from a compressed-air system or via a compressor. The upper side 6 of the intermediate piece 4 is connected via a flanged connection 7 to a feedline 8 (only partially shown).

An outlet tube 9 is flanged on the underside of the lower tube part 3. Said outlet tube 9 bears, with an annular stop 10, on an introduction stub 11 (shown by broken lines) of a filling container (not shown in any more detail). The lower end of the outlet tube 9 exhibits, in the region of its outlet opening 12, an extension 13 which has a widened circumference. A deflection body 14 is located beneath the outlet tube 9. The special shaping of the deflection body 14 and of the annular extension 13 produces an outlet opening 12 in the form of an annular slot.

The deflection body 14 is secured displaceably in a transverse-web cross 16 via an axial bolt 15. A cable pull 17 acts on the upper side of the transverse-web cross or on a further transverse-web cross, as is indicated by the arrow S. The cable pull 17 is guided vertically upwards into the upper tube part 2 and, there, is guided outwards in the horizontal direction via a deflection pulley 18 and via a lead-through 19. By moving the cable pull 17 in the direction of the double arrow $P_2$, the lower tube part 3 can thus be displaced in height. In one variant, the cable pull 17 can also act on the axial bolt 15, with the result that, when the cable pull 17 is pulled, first of all the outlet opening 12 is closed by the deflection body 14 and subsequently the lower tube part 3 is raised.

Figure 2:
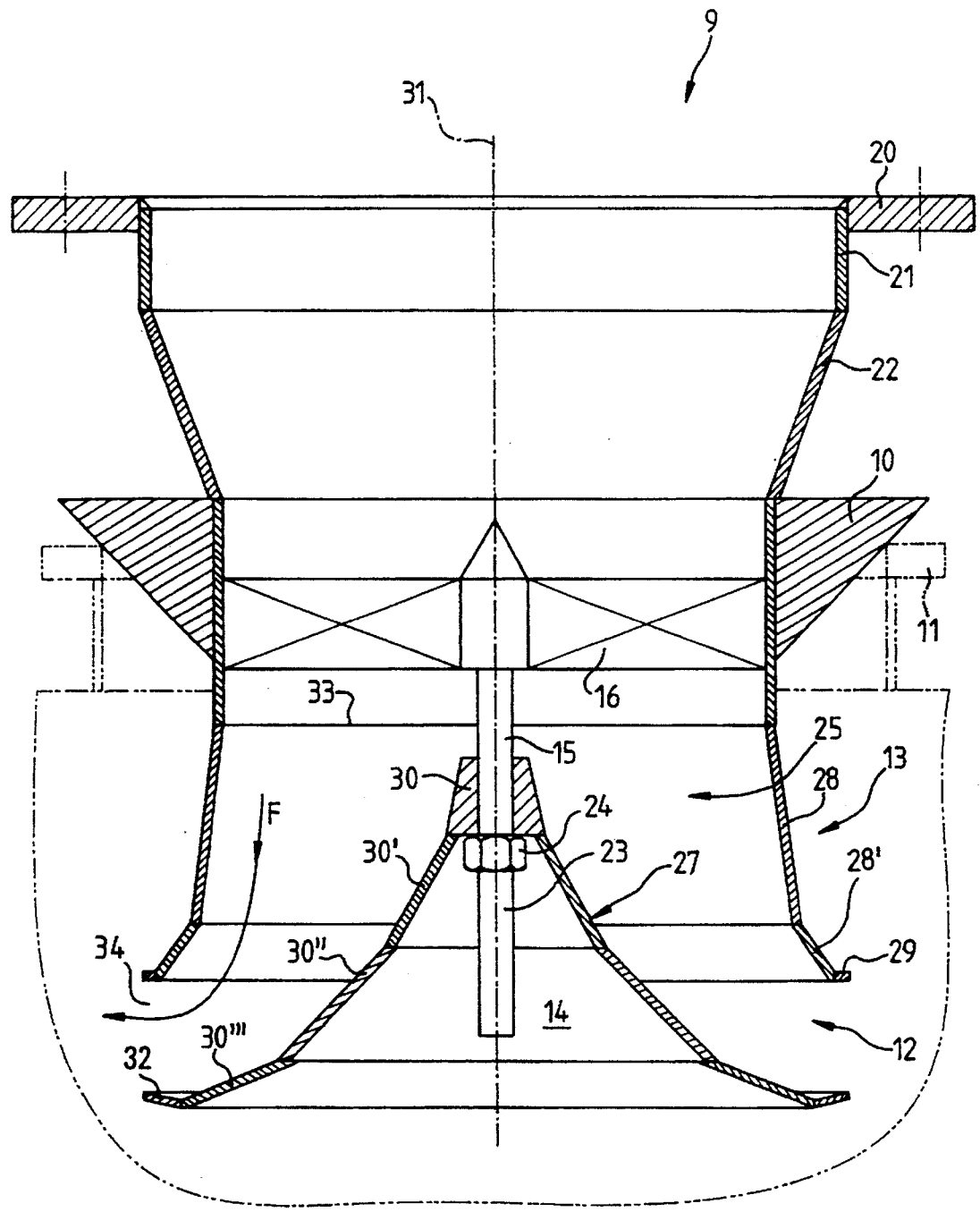
FIG. 2 shows a sectional representation of the detail A in FIG. 1.

The outlet tube 9, located in section A according to FIG. 1, is shown in section and on an enlarged scale in FIG. 2. Its fastening flange 20 is adjoined by a short cylindrical section 21 and a frustoconical section 22, by means of which the diameter of the outlet tube 9 is somewhat reduced. As a result, the outlet tube 9 can be readily introduced into the introduction stub 11 even with its widened extension 13.

In this exemplary embodiment, the deflection body 14 is fastened on the axial bolt 15 via a threaded section 23 and a corresponding securing nut 24 and, in addition, is adjustable in height.

The inner side or underside 25 of the widened extension 13 forms the outer wall, which serves as outer guide surface, of a deflecting and accelerating duct 26 which is designed, according to the invention, as an annular gap. The outer or upper side 27 of the deflecting body 14 thus forms the inner wall, which serves as inner guide surface, of the deflecting and accelerating duct 26. In the present exemplary embodiment, the widened extension 13 is formed from two frustoconical sections 28, 28' and a horizontally adjoining annular section 29. The deflection body 14 is made up of four frustoconical sections 30, 30', 30" and 30'" and of a frustoconical section 32 which is aligned slightly upwards preferably by 5° to 15°. In the depicted sectional representation with the section plane through the central axis 31, both the outer wall and the inner wall of the deflecting and accelerating duct 26 are in the form of a polygonal progression.

Figure 3:
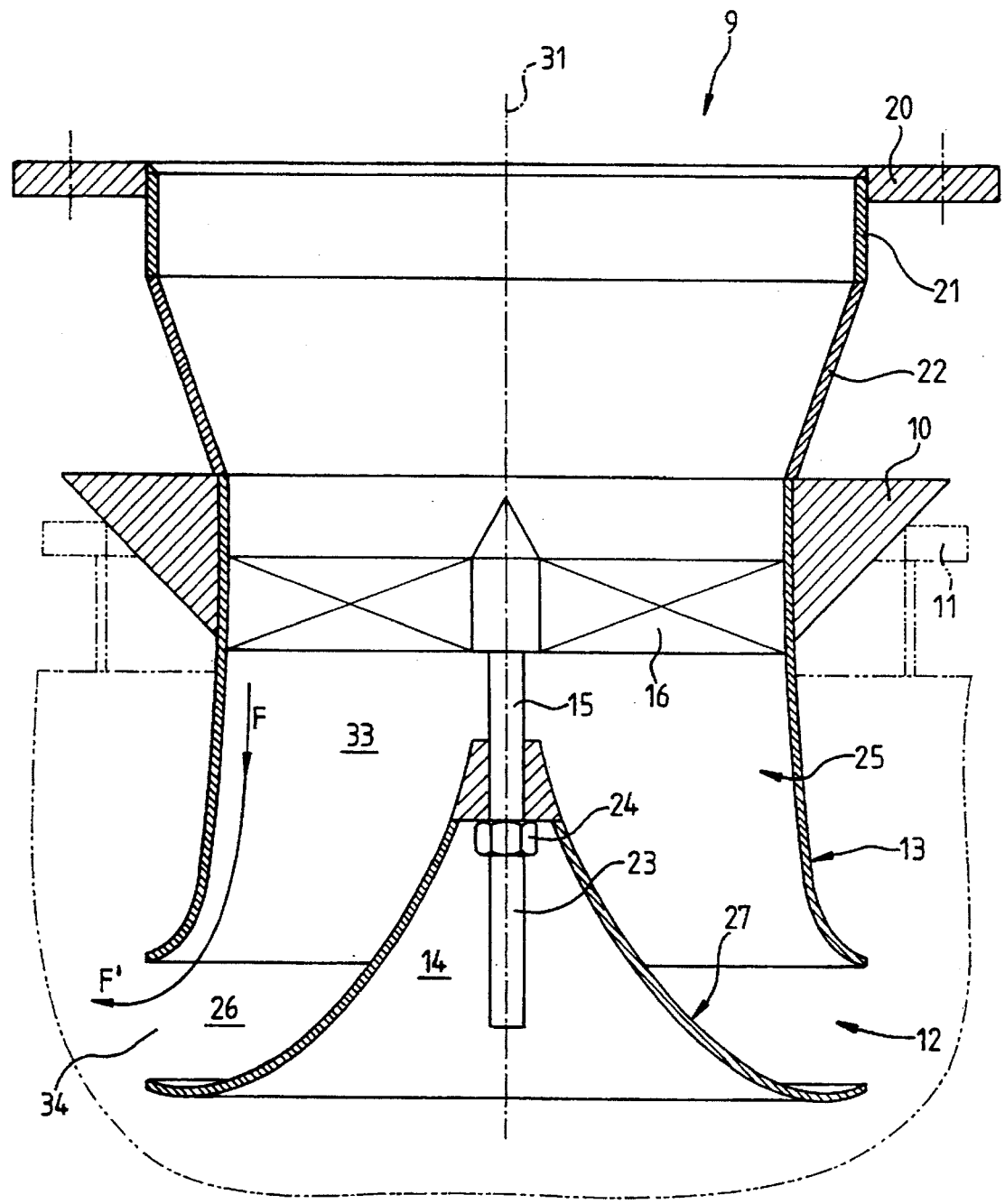
FIG. 3 shows a representation, corresponding to the representation according to FIG. 2, of a further exemplary embodiment.

The representation according to FIG. 3 largely corresponds to that of FIG. 2. The difference consists in the fact that, here, the inner side or underside 25 of the widened extension 13, i.e. the outer wall, which serves as the outer guide surface, of the deflecting and accelerating duct 26, exhibits a continuous arcuate curvature, as does the outer side or upper side 27 of the deflection body 14, which forms the inner wall, which serves as the inner guide surface, of the deflecting and accelerating duct 26 in the form of an annular slot. This produces an annular slot 26 which exhibits the form or an annular-slot arc. The radii of curvature of the inner guide surface 27 and outer guide surface 25 of said annular-slot arc exhibit different and variable radii of curvature. In the outermost border region 32, the guide surface 27 of the deflection body 14 is curved slightly upwards beyond the horizontal.

In the two exemplary embodiments, both according to FIG. 2 and according to FIG. 3, the annular slot 26 exhibits a continuous tapering in cross section from its inlet opening 33 to its mouth 34. By virtue of this tapering in cross section, the bulk-material stream flowing in a vertical conveying direction F from top to bottom is accelerated in accordance with the rules of fluid mechanics and, at the same time, is diverted, by the guide surfaces 25, 27 of the annular slot 26, into the conveying direction F' which is deflected slightly upwards out of the horizontal.

In this manner, the bulk materials, due to the transverse accelerations occurring in the annular slot 26, is discharged at an increased speed in the transverse direction F' from the mouth 34 of the annular slot 26. Consequently, said materials can also reach filling-container regions which are very remote from the central axis 31 of the loading tube 1, as a result of which there is a largely horizontal bulk-material distribution in the filling container. Consequently, considerably higher degrees of filling are achieved, no movable parts being used and, in addition, the use of a pneumatic conveying device not being absolutely necessary.

Figure 4:
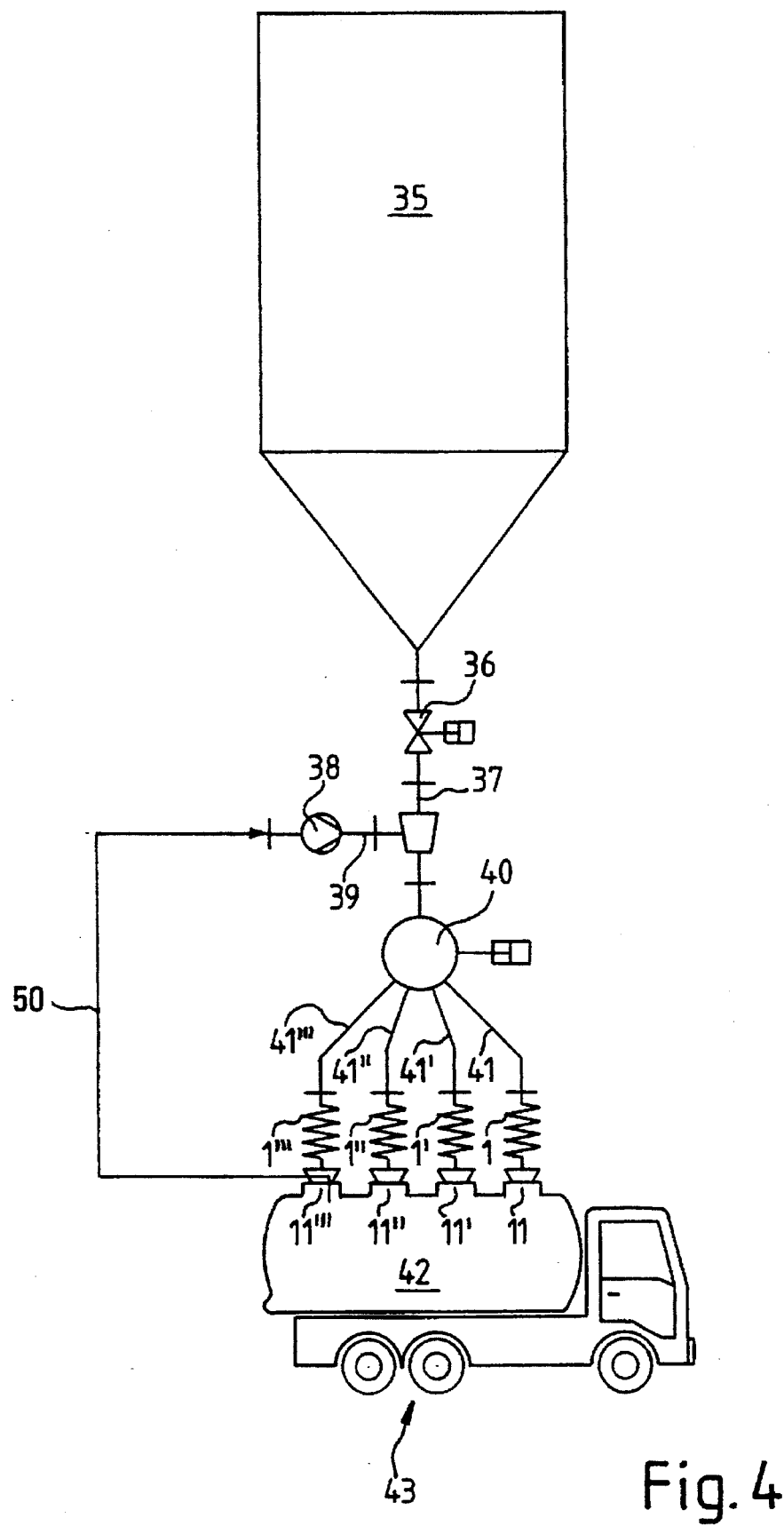
FIG. 4 shows a schematic representation of the application of a loading apparatus according to the invention.
Figure 5:
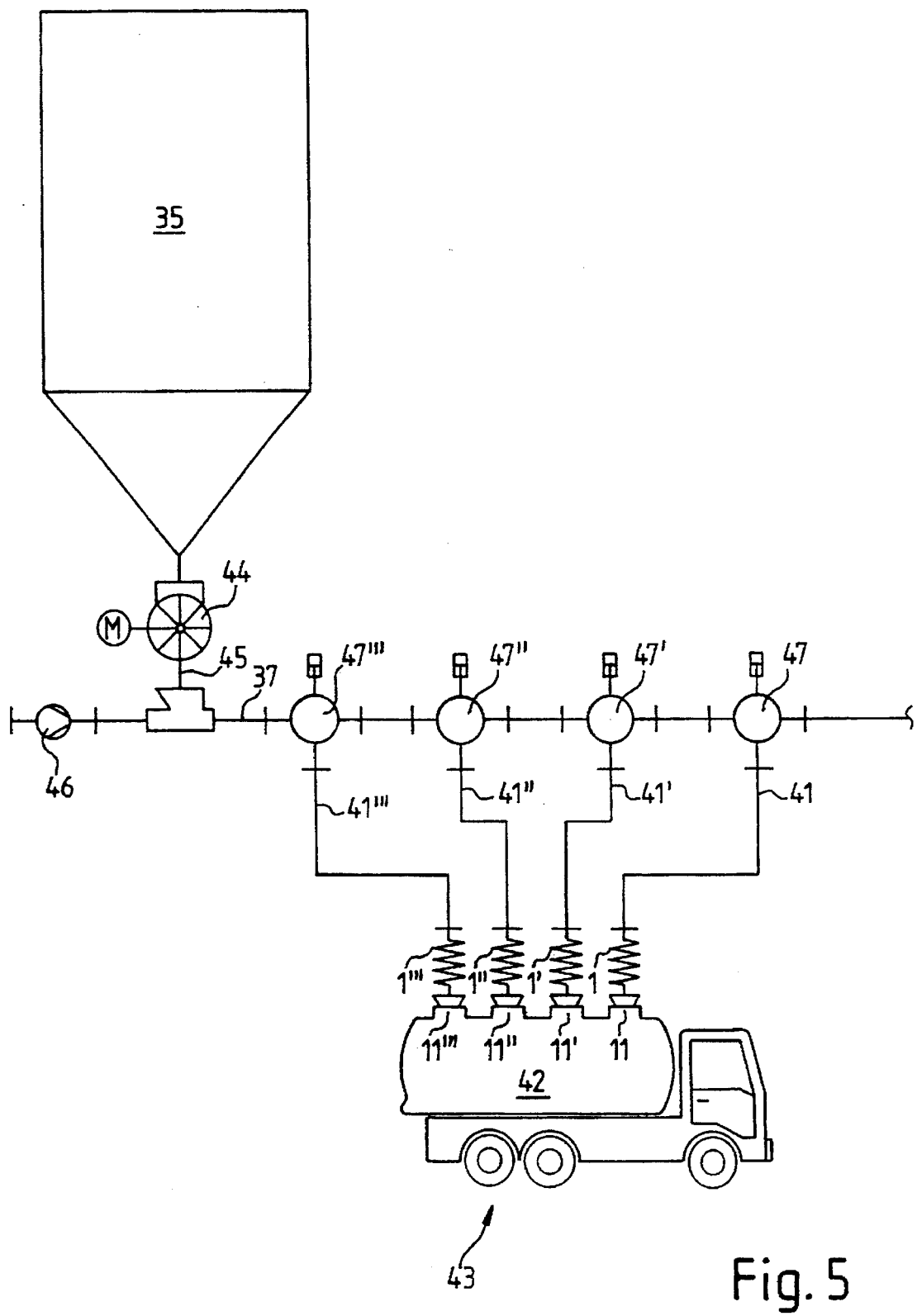
FIG. 5 shows a representation, corresponding to FIG. 4, of a further exemplary embodiment.

The representations of FIGS. 4 and 5 show, schematically, the possible applications of a loading apparatus according to the invention. From a storage silo 35, the bulk-material stream passes via a shut-off member 36 into the conveying line 37. Gas, for example air, is fed into the conveying line 37 by means of a compressor 38 and a branch line 39 with low pressure in order to loosen the bulk materials. Said conveying line 37 then opens into a quadruple diverter 40, by way of which the bulk-material stream can be optionally deflected to four feedlines 41, 41', 41", 41'". The feedlines 41 are, for their part, each connected to a length-displaceable loading tube 1, 1', 1", which are introduced into introduction stubs 11, 11', 11" and 11'" of a filling container 42. The filling container 42 is mounted on a lorry 43.

As further illustrated in FIG. 4, the gas introduced with the bulk material into the filling container 42 and accumulating above the deposited material may be withdrawn through a line 50 and reintroduced into the loading apparatus.

When the filling container 42 is being filled, the bulk-material stream moves in the depicted arrangement from the storage silo 35 via the shut-off member 36 into the conveying line 37, where it is loosened by the gas feed, with the result that it has the desired flow behaviour. It is then introduced into the various parts of the filling container 42 via the multiple diverter 40, the feedline 41 and the loading tubes 1 to 1'". Since each loading tube 1 to 1'" exhibits, at its end, an outlet nozzle according to the invention with deflecting and accelerating duct 26, the filling container 42 can be charged with an optimum degree of filling.

The exemplary embodiment according to FIG. 5 shows the application of loading tubes 1 to 1'" according to the invention with the utilization of a pneumatic conveying device. For this purpose, a rotary feeder 44 is provided at the outlet of the storage silo 35. Beneath the rotary feeder 44, the bulk materials drop into the conveying line 37 via a vertical line 45.

In contrast to the abovementioned exemplary embodiment, in which the bulk materials are loosened and accelerated at a low gas pressure simply with utilization of gravitational force, the bulk materials, in a pneumatic conveying device as in the present case, are transported by very high conveying pressure which is blown into the conveying line 37 by way of the compressor 46. In this arrangement, the conveying stream can, in turn, be directed into various feedlines 41 to 41'" by way of a plurality of single diverters 47. Here too, in the case of the loading tubes 1 to 1'", it is possible to use a deflecting and accelerating duct 26 according to the invention, with the result that an optimum degree of filling in the filling container 42 is achieved once again.

We claim:

1. A loading apparatus for bulk material, comprising
   (a) a loading tube having a longitudinal axis, an outer tube surface, an inner tube surface and a material discharge end;
   (b) a deflection body having an outer body surface and being arranged generally coaxially with said loading tube at said material discharge end thereof; said deflection body being situated partially inside and partially outside of said loading tube; said outer body surface and said inner tube surface together defining an annular channel surrounding said longitudinal axis; said outer body surface and said inner tube surface each having a terminal peripheral portion together defining a circumferential, deflecting and accelerating duct forming part of said annular channel and terminating in an annular outlet slot surrounding said longitudinal axis; said terminal peripheral portion of said outer body surface being oriented away from said longitudinal axis such as to effect a radially outward flow of the bulk material from said loading tube; said terminal peripheral portions of said outer body surface and said inner tube surface being substantially equidistant from said longitudinal axis; and
   (c) securing means for attaching said deflection body to said loading tube.

2. The loading apparatus as defined in claim 1, wherein said annular channel has, in an axial section, a progressively narrowing width and an arcuate course changing from a substantially axial orientation to a substantially radial orientation as viewed axially in a direction of said annular outlet slot.

3. The loading apparatus as defined in claim 1, wherein said annular channel continuously narrows towards said annular outlet slot as viewed in a direction parallel to said longitudinal axis.

4. The loading apparatus as defined in claim 1, wherein said terminal peripheral portion of said inner tube surface has an increasing diameter as viewed axially in a direction toward said terminal peripheral portion of said outer body surface.

5. The loading apparatus as defined in claim 1, wherein said outer body surface includes a plurality of axially adjoining frustoconical portions of consecutively increasing cone angles as viewed axially in a direction of said terminal peripheral portion of said outer body surface; each frustoconical portion widening as viewed axially in a direction of said terminal peripheral portion of said outer body surface.

6. The loading apparatus as defined in claim 1, wherein said inner tube surface includes a frustoconical portion widening as viewed axially in a direction of said terminal peripheral portion of said inner tube surface.

7. A loading apparatus for bulk material, comprising
   (a) a plurality of loading tubes each having a longitudinal axis, an outer tube surface, an inner tube surface and a material discharge end;
   (b) a separate deflection body supported by each said loading tube; each deflection body having an outer body surface and being arranged generally coaxially with a respective said loading tube at said material discharge end thereof; each said deflection body being situated partially inside and partially outside of said respective loading tube; said outer body surface and said inner tube surface together defining an annular channel surrounding said longitudinal axis; said outer body surface and said inner tube surface each having a terminal peripheral portion together defining a circumferential, deflecting and accelerating duct forming part of said annular channel and terminating in an annular outlet slot surrounding said longitudinal axis; said terminal peripheral portion of said outer body surface being oriented away from said longitudinal axis such as to effect a radially outward flow of the bulk material from said loading tube; said terminal peripheral portions of said outer body surface and said inner tube surface being substantially equidistant from said longitudinal axis;
   (c) securing means for attaching separate said deflection bodies to said respective loading tubes;
   (d) a common conveying line guiding the bulk material therein; and
   (e) a diverter for receiving the bulk material from said conveying line and for advancing the bulk material to at least one of said loading tubes.

8. A loading apparatus for bulk material, comprising (a) a loading tube having a substantially vertically oriented longitudinal axis, an outer tube surface, an inner tube surface and a material discharge end;

(b) a deflection body having an outer body surface and being arranged generally coaxially with said loading tube at said material discharge end thereof; said deflection body being situated partially inside and partially outside of said loading tube; said outer body surface and said inner tube surface together defining an annular channel surrounding said longitudinal axis; said outer body surface and said inner tube surface each having a terminal peripheral portion together defining a circumferential, deflecting and accelerating duct forming part of said annular channel and terminating in an annular outlet slot surrounding said longitudinal axis; said terminal peripheral portion of said outer body surface being oriented away from said longitudinal axis such as to effect a radially outward flow of the bulk material from said loading tube; said terminal peripheral portion of said outer body surface extending upwardly, at an inclination to the horizontal, as viewed in a direction radially outwardly from said longitudinal axis; and (c) securing means for attaching said deflection body to said loading tube.

9. The loading apparatus as defined in claim 8, wherein said inclination to the horizontal is between 5° and 15°.

10. A loading apparatus for bulk material, comprising (a) a plurality of loading tubes each having a substantially vertically oriented longitudinal axis, an outer tube surface, an inner tube surface and a material discharge end;

(b) a separate deflection body supported by each said loading tube; each deflection body having an outer body surface and being arranged generally coaxially with a respective said loading tube at said material discharge end thereof; each said deflection body being situated partially inside and partially outside of said respective loading tube; said outer body surface and said inner tube surface together defining an annular channel surrounding said longitudinal axis; said outer body surface and said inner tube surface each having a terminal peripheral portion together defining a circumferential, deflecting and accelerating duct forming part of said annular channel and terminating in an annular outlet slot surrounding said longitudinal axis; said terminal peripheral portion of said outer body surface being oriented away from said longitudinal axis such as to effect a radially outward flow of the bulk material from said loading tube; said terminal peripheral portion of said outer body surface extending upwardly, at an inclination to the horizontal, as viewed in a direction radially outwardly from said longitudinal axis;

(c) securing means for attaching separate said deflection bodies to said respective loading tubes;

(d) a common conveying line guiding the bulk material therein; and (e) a diverter for receiving the bulk material from said conveying line and for advancing the bulk material to at least one of said loading tubes.

11. A loading apparatus for bulk material, comprising (a) a loading tube having a longitudinal axis, an outer tube surface, an inner tube surface and a material discharge end toward which the bulk material travels in a flow direction;

(b) a deflection body having an outer body surface and being arranged generally coaxially with said loading tube at said material discharge end thereof; said deflection body being situated partially inside and partially outside of said loading tube; said outer body surface and said inner tube surface together defining an annular channel surrounding said longitudinal axis; said outer body surface and said inner tube surface each having a terminal peripheral portion together defining a circumferential, deflecting and accelerating duct forming part of said annular channel and terminating in an annular outlet slot surrounding said longitudinal axis; said terminal peripheral portion of said outer body surface being oriented away from said longitudinal axis such as to effect a radially outward flow of the bulk material from said loading tube; said inner tube surface having an axial length portion composed of a plurality of axially adjoining flaring surfaces widening in said flow direction; consecutive said flaring surfaces forming increasing angles with said longitudinal axis as viewed in said flow direction; said terminal peripheral portion of said inner tube surface forming part of said axial length portion; said outer body surface having an axial length portion composed of a plurality of axially adjoining flaring surfaces widening in said flow direction; consecutive said flaring surfaces of said axial length portion of said outer body surface having increasing angles with said longitudinal axis as viewed in said flow direction; said terminal peripheral portion of said outer body surface forming part of said axial length portion of said outer body surface; and (c) securing means for attaching said deflection body to said loading tube.

12. The loading apparatus as defined in claim 11, wherein said securing means includes means for axially adjusting said deflection body relative to said loading tube for varying a cross-sectional area of said annular channel.

13. The loading apparatus as defined in claim 11, further comprising gas supply means for introducing a gas into said loading tube to flow in a direction of said outlet opening; said gas supply means including means for regulating a gas feed for loosening the bulk material and affecting an outlet velocity thereof.

14. The loading apparatus as defined in claim 13, in combination with a filling container; said loading tube being positioned above said filling container such that said filling container receives the bulk material from said loading tube; further comprising means for extracting the gas accumulating above the deposited bulk material in said filling container and for reintroducing the gas into said loading apparatus.

15. The loading apparatus as defined in claim 11, wherein the consecutive flaring surfaces adjoin one another at an angle defining an edge between the consecutive flaring surfaces.

16. The loading apparatus as defined in claim 11, wherein the consecutive flaring surfaces adjoin one another with a continuous arcuate curvature.

17. A loading apparatus for bulk material, comprising (a) a plurality of loading tubes each having a longitudinal axis, an outer tube surface, an inner tube surface and a material discharge end toward which the bulk material travels in a flow direction;

(b) a separate deflection body supported by each said loading tube; each deflection body having an outer body surface and being arranged generally coaxially with a respective said loading tube at said material discharge end thereof; each said deflection body being situated partially inside and partially outside of said respective loading tube; said outer body surface and said inner tube surface together defining an annular channel surrounding said longitudinal axis; said outer body surface and said inner tube surface each having a terminal peripheral portion together defining a circumferential, deflecting and accelerating duct forming part of said annular channel and terminating in an annular outlet slot surrounding said longitudinal axis; said terminal peripheral portion of said outer body surface being oriented away from said longitudinal axis such as to effect a radially outward flow of the bulk material from said loading tube; said inner tube surface having an axial length portion composed of a plurality of axially adjoining flaring surfaces widening in said flow direction; consecutive said flaring surfaces forming increasing angles with said longitudinal axis as viewed in said flow direction; said terminal peripheral portion of said inner tube surface forming part of said axial length portion; said outer body surface having an axial length portion composed of a plurality of axially adjoining flaring surfaces widening in said flow direction; consecutive said flaring surfaces of said axial length portion of said outer body surface having increasing angles with said longitudinal axis as viewed in said flow direction; said terminal peripheral portion of said outer body surface forming part of said axial length portion of said outer body surface;

(c) securing means for attaching separate said deflection bodies to said respective loading tubes;

(d) a common conveying line guiding the bulk material therein; and (e) a diverter for receiving the bulk material from said conveying line and for advancing the bulk material to at least one of said loading tubes.

18. The loading apparatus as defined in claim 17, wherein the consecutive flaring surfaces adjoin one another at an angle defining an edge between the consecutive flaring surfaces.

19. The loading apparatus as defined in claim 17, wherein the consecutive flaring surfaces adjoin one another with a continuous arcuate curvature.

* * * * *